Figure 7:
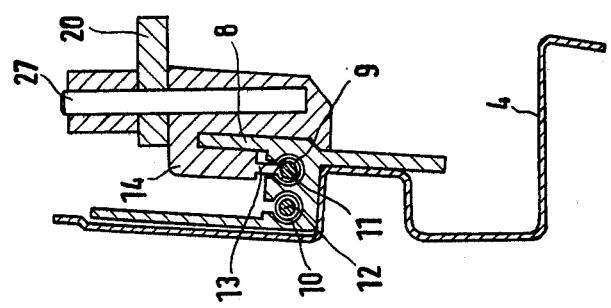

United States Patent [19]

Schlapp

[11] 4,085,965
[45] Apr. 25, 1978

[54] SLIDING ROOFS FOR AUTOMOBILES

[75] Inventor: Albert Schlapp, Sprendlingen, Germany

[73] Assignee: American Sunroof Manufacturing Company, Southgate, Mich.

[21] Appl. No.: 705,956

[22] Filed: Jul. 16, 1976

[30] Foreign Application Priority Data

Jul. 18, 1975 Germany .............................. 2532187

[51] Int. Cl.² ............................................... B60J 7/04
[52] U.S. Cl. .................................... 296/137 F; 98/2.14
[58] Field of Search ........... 296/137 F, 137 E, 137 G, 296/137 B; 98/2.14

[56] References Cited

U.S. PATENT DOCUMENTS 3,960,404  6/1976  Bienert .............................. 296/137 F

FOREIGN PATENT DOCUMENTS 2,249,718  4/1974  Germany ......................... 296/137 E Primary Examiner—Evon C. Blunk
Assistant Examiner—Michael J. Forman
Attorney, Agent, or Firm—Everett R. Casey

[57] ABSTRACT

An automobile sliding roof, adapted to be alternatively positioned, includes a rigid sliding cover guided with forward and rear sliding shoes on laterally-mounted guide rails in the automobile roof opening, thrust-transmitting cables engaging the rear sliding shoes, pivot bearings on the forward sliding shoes permitting pivotal action of the cover about a horizontal axis extending transversely to the sliding direction, guide blocks secured to the longitudinal edges of the cover into which guide pins mounted on the rear sliding shoes engage and by which the cover, from its closed position, can be pivoted such that its rear edge is above the automobile roof surface or can be rearwardly slid underneath the roof surface.

8 Claims, 12 Drawing Figures

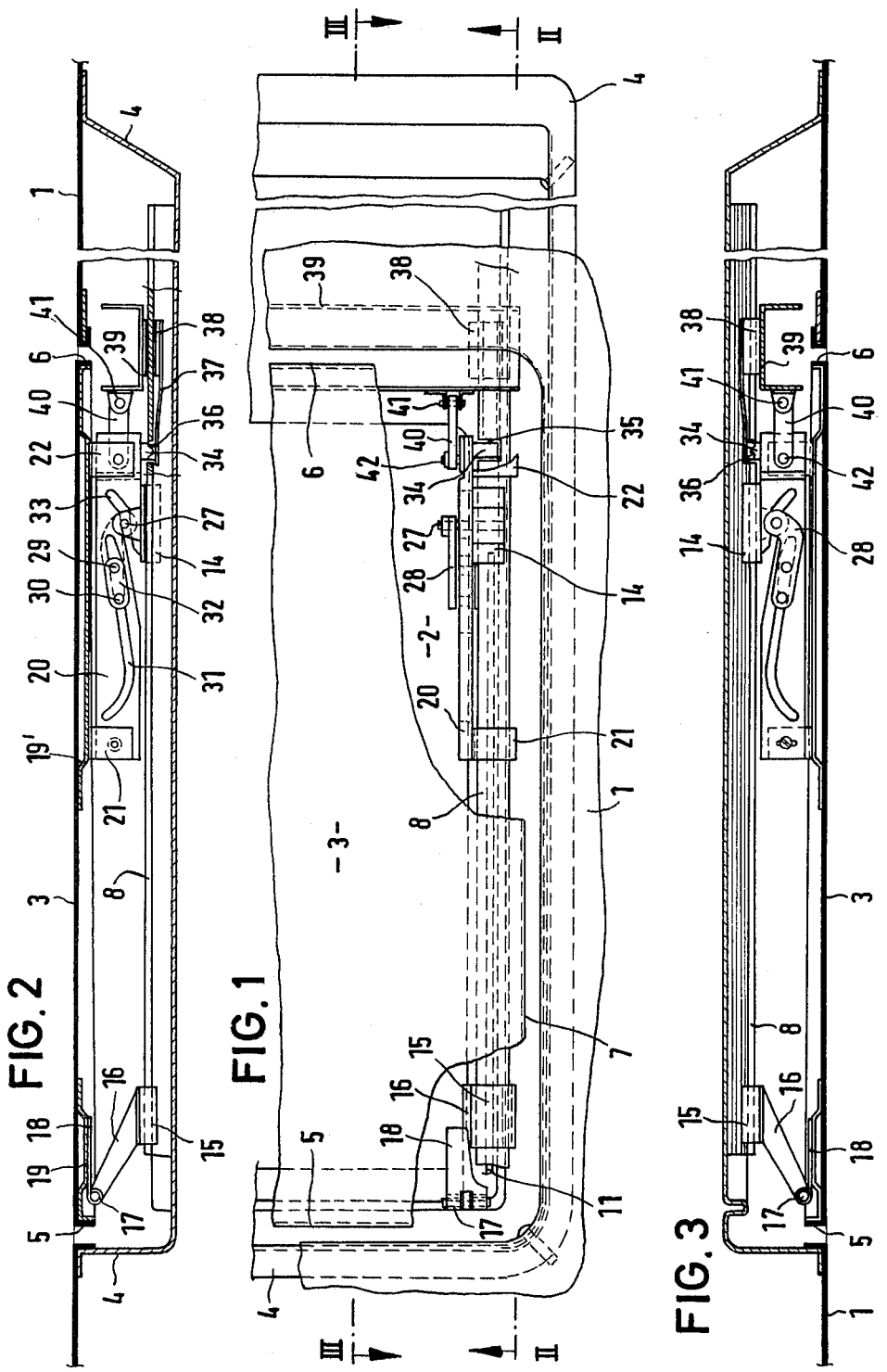

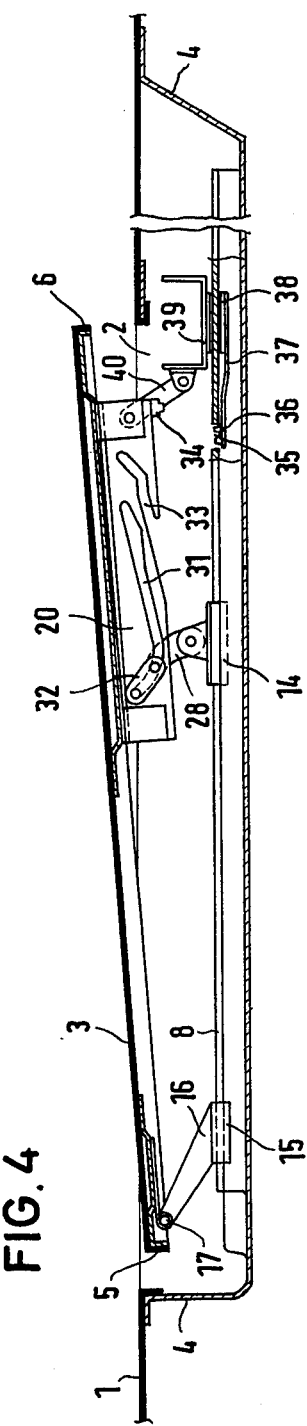
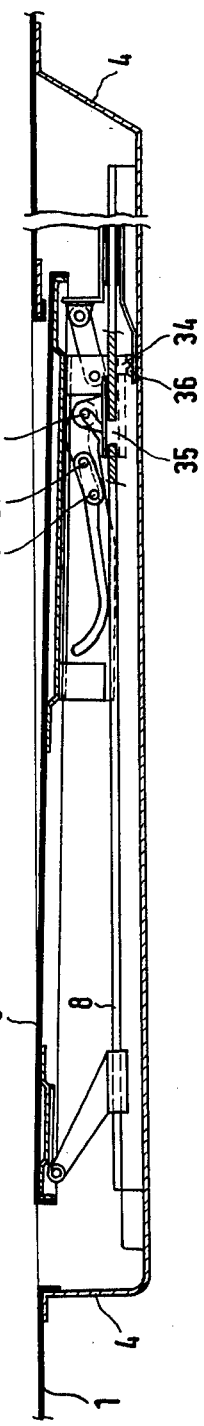
FIG. 4
FIG. 5

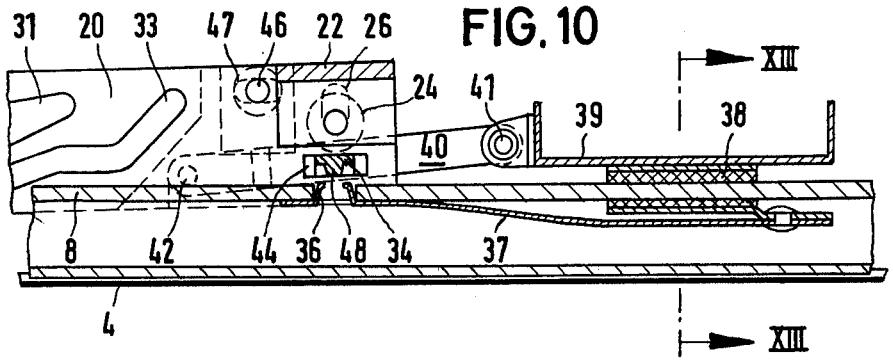
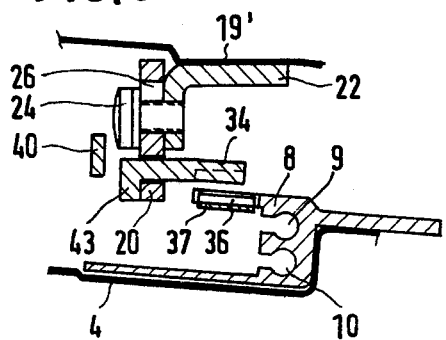
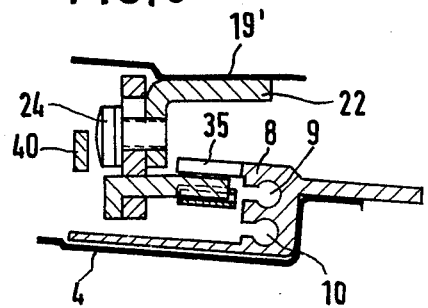
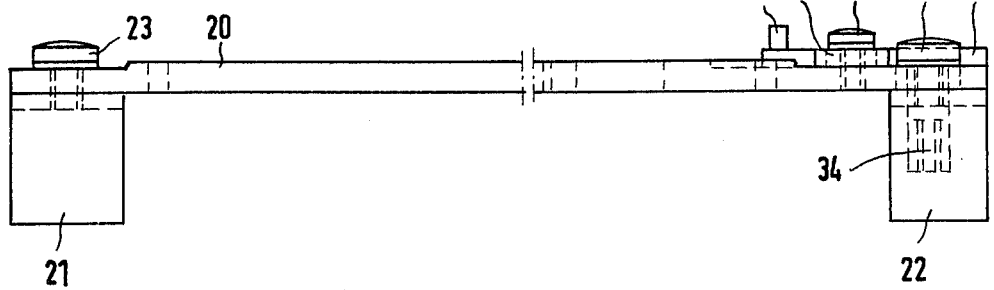
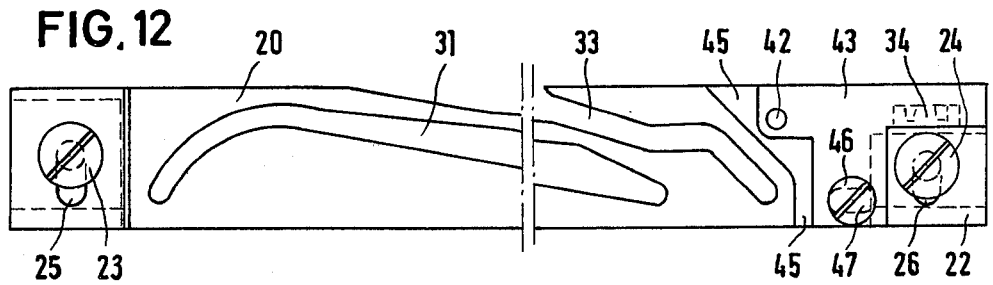

SLIDING ROOFS FOR AUTOMOBILES

This invention relates to a sliding roof for automobiles, comprising a rigid sliding cover, which is guided with forward and rear sliding shoes on guide rails mounted laterally in the roof opening, is driven by guided thrust-transmitting cables engaging the rear sliding shoes, is journalled on pivot bearings mounted on the forward sliding shoes to pivot about a horizontal axis extending transversely to the sliding direction, and is equipped along its longitudinal edges with guide blocks secured to it, into which guide pins mounted on the rear sliding shoes engage, by which the sliding cover, starting from its closed position, can either be pivoted like front-hinged ventilator flaps by lifting its rear edge above the stationary roof surface or, after its rear edge has been lowered, can be slid underneath the rear fixed roof surface.

A sliding roof of this construction offers, by comparison with a sliding roof with sliding-only cover, the advantage that even at high speeds a ventilation free from noise, vibration and drought is possible for the interior of the vehicle, without the requirement of an additional wind deflector. For this purpose, the sliding cover itself is swung upwards similarly to a wind deflector. A sliding roof of this type combines the advantages of the known ventilator flaps with those of the known steel sliding roofs, without however possessing the disadvantages of each.

When the sliding cover is swung in again from a swung-out position into a slightly inclined swung-out position or into its closed position, which is done by means of the guide pins engaging in the guide blocks, care must be taken to ensure that the guide pins cannot entrain the swung-out sliding cover in the direction of its opening displacement. This would result in the swung-out sliding cover resting upon the rear edge of the roof opening and thus prevent closure of the roof and also involve the risk of damage to the drive elements, or at least a risk of damage to the paintwork.

To avoid such faulty operation, a frictional connection must exist between parts attached to the sliding cover and stationary parts, to prevent sliding of the cover in the direction of opening sliding during swinging-in of the cover. For this purpose, it has already been proposed (DT-AS No. 1,605,960), that a stop shall be fixed to the cover at least on one side thereof ahead of the forward pivoting axis, which stop shall engage a stationary stop in such a way that the stops, at the end of the lowering motion, disengage. These stops must however be accurately adjusted relative to each other and in respect of their mutual overlap. Since these adjustments must be carried out with the cover closed, the necessary operation is difficult and time-consuming.

In another known form of construction (DT-OS No. 2,249,718) for the parts preventing undesired sliding of the cover, provision is made that, on at least one of the two forward sliding shoes or a part connected thereto, a detent notch is provided, into which a corresponding stationary projection is resiliently engaged in the forward stop position of the sliding cover. This form of construction has indeed proved satisfactory in practice, but is also requires an exact adjustment in regard to the forward position of the cover and in regard to the arrangement of the detent position relative to the forward sliding shoes. Moreover, the force of the spring applied to the stationary projection must be so selected and adjusted that on the one hand the sliding cover is firmly held during swinging-in movements and on the other hand the torque at the operating crank or electrical drive, which must be applied to overcome the spring force at the start of the cover opening movement, does not become too large. This tuning of the spring also requires a not inconsiderable amount of effort.

The problem underlying this invention is to propose a sliding roof possessing functionally reliable, easily adjustable and easily installed security against displacement, which provides for a positively controlled sequence of movement during swinging-in and swinging-out of the roof cover.

Starting from a sliding roof of the category initially referred to, this problem is solved in that there are provided, opposite to one another on each side of the sliding cover, a guide finger secured to the sliding cover near to its rear edge and transversely to the direction of sliding, opposite to which, in the closed position of the sliding cover, a corresponding recess is situated in an elongated, stationary guide element disposed in the sliding direction, into which recess a spring-loaded detent element engages except when the sliding cover is displaced, which detent element is connected at an invariable distance to a guide piece situated in the vicinity of the rear edge of the sliding cover and displaceably guided on the adjacent guide rail, which guide piece is connected to the sliding cover by a connecting strap which is hinged on the one hand to the sliding cover and on the other hand to the guide piece so as to pivot in a vertical plane lying in the sliding direction, whereby the guide finger, when the rear edge of the cover is lowered disengages the detent element out of the recess, penetrates through the recess and, during subsequent sliding of the cover, is guided on the lower side of the guide element.

In the solution according to this invention, the sliding cover, during its inward-swinging movement and also during its outward-swinging movement, is reliably secured against any sliding motion by the detent elements engaging into the recesses, and is also positively guided by the connecting straps, so that is is quite impossible for the sliding cover to rest on the rear edge of the roof opening. The guide fingers here provide a double function, on the one hand ensuring that the detent elements, during lowering of the rear edge of the cover, are disengaged before the roof opening displacement is commenced, and on the other hand ensuring, by resting against the lower faces of the guide element, that the rear edge of the cover remains in its lowered position during sliding movements of the sliding cover.

The adjustment of the sliding roof according to this invention is simple throughout, because it is now only necessary to ensure that the guide fingers, in the closed position of the roof, are opposite to the recesses in the guide elements, which can with advantage be achieved by attaching the guide fingers to the ends of the guide blocks nearest to the rear edge of the cover in such a way that they can be adjusted in the sliding direction. In this way, adjustment of the guide fingers to align with the recesses can be simply and rapidly carried out. Additional adjustment of the detent elements is not necessary, because these are in an invariable position relative to the guide fingers.

According to one preferred embodiment of the sliding roof according to this invention, the recesses are provided in the guide rails for the sliding shoes themselves, so that the fitting of additional, elongated stationary guide elements is unnecessary.

With advantage, the arrangement of the spring-loaded detent elements is such that these are each secured at the end of a leaf-spring extending underneath the associated guide rail, this spring being attached by its other end to the associated guide piece. The leaf-spring here ensures spring-loading of the detent element, causing this element to engage positively into the associated recess, so long as the detent element is not disengaged from this recess by the guide finger. Also, the leaf-spring provides the connection of invariable length between the detent element and the associated guide piece.

In the preferred form of embodiment, the oppositely situated guide pieces are connected firmly to each other by the water gutter which in known manner is situated under the rear edge of the cover and moves with it, the connecting straps being hinged at one end to the water gutter.

An especially simple and compact construction is obtained if the connecting straps are hinged at their other end, with adjustment in the sliding direction, to the ends of the guide blocks nearest to the rear edge of the cover.

The arrangement here may with advantage be such that the guide fingers are each situated on a plate attached adjustably to the guide block, and also carrying the hinge pin for the associated connecting strap. An adjustment of this plate relative to the guide block therefore results in simultaneous adjustment of the guide finger situated on the plate and of the hinge pin also mounted on the plate. In this way it is ensured that no relative displacements can take place between the connecting strap or its attachment point to the guide block and the detent element.

The guide finger may with advantage be provided on its surface towards the detent element with an axis-parallel rib or the like, which positively engages into the detent element in the closed position and every sliding open position.

This positive connection between the parts referred to also facilitates the adjustment of the guide fingers in relation to the recesses opposite to them in the closed position of the cover.

Further details of the invention are explained below with reference to the drawings illustrating an example of embodiment thereof. The drawings show:

FIG. 1 a cut off and partly cut away plan on the sliding roof of this invention, with the sliding cover in the closed position, FIG. 2 a longitudinal section through the sliding roof along II—II in FIG. 1, FIG. 3 a further longitudinal section through the sliding roof, but along III—III in FIG. 1, FIG. 4 a section similar to FIG. 2, but with the sliding cover swung-out, FIG. 5 a section also like FIG. 2, with the sliding cover partly pushed beneath the rear roof surface.

Figure 6:
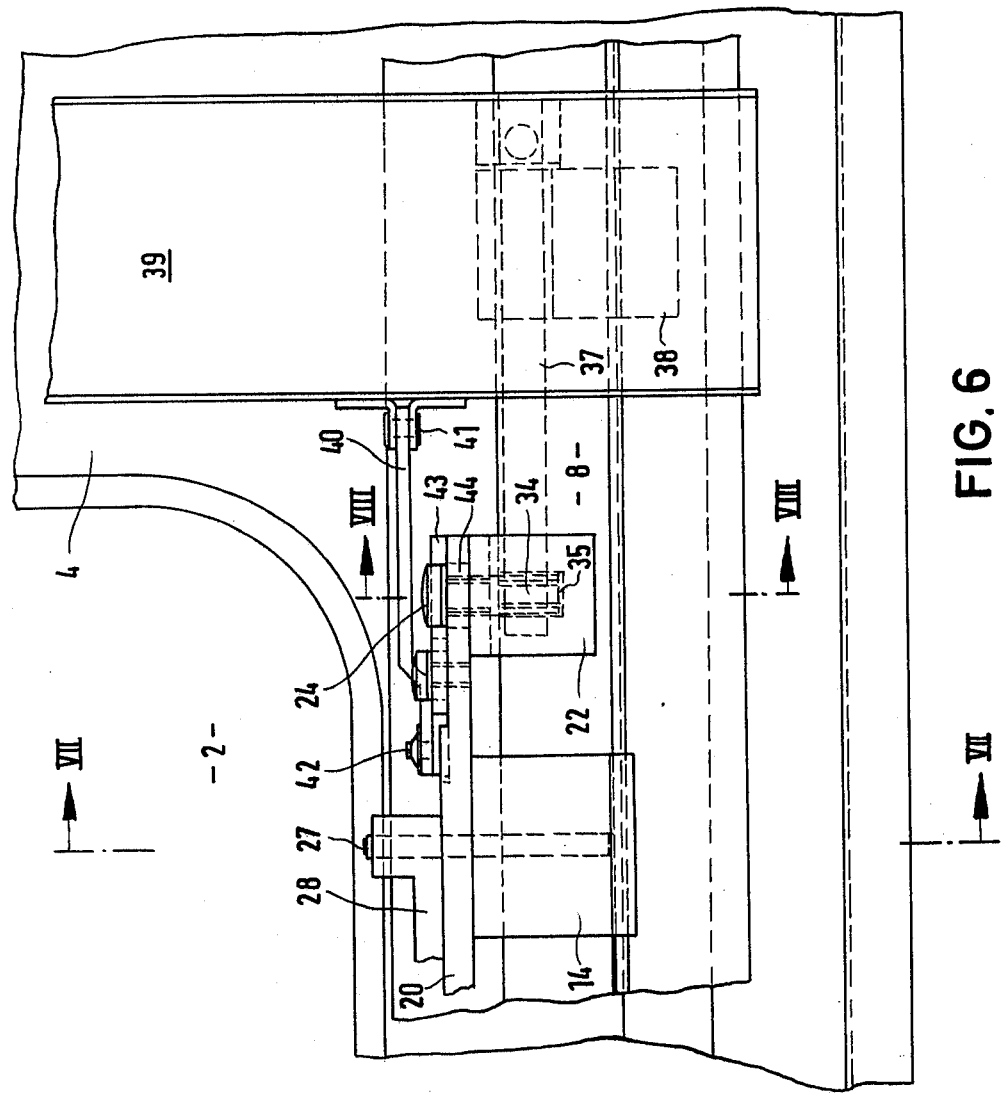

FIG. 6 a cut off view, to a larger scale, of the rear corner of the sliding roof frame with the cover removed and the roof surface not shown, FIG. 7 a cross-section through the sliding roof frame and a rear sliding shoe along VII—VII of FIG. 6, FIG. 8 a further cross-section, in the vicinity of the guide finger along VIII—VIII of FIG. 6, FIG. 9 a section similar to FIG. 8 with the guide finger underneath the guide rail, FIG. 10 a cut off longitudinal section similar to FIG. 2 but to a larger scale, which illustrates the arrangement of the leaf-spring with detent element and connecting strap, FIG. 11 a plan on a guide block with the parts attached thereto and, FIG. 12 an internal elevation of the guide block shown in FIG. 11.

FIGS. 1 to 5 show, in cut-away view, the stationary roof 1 of a personnel carrying automobile, with the roof opening 2 provided therein, which can be closed by the sliding cover 3. The edges of the roof opening are downwardly flanged and are reinforced conventionally by the sliding roof frame 4, for example deep-drawn in a single piece. A description of the constructional detail of the sliding roof frame is omitted below, because it does not require any special form for use in this invention. Also, the known cable drive which causes the movements of the sliding cover 3 is explained below only to the extent which appears necessary for an understanding of the invention. The edge seal present normally between the edges of the roof opening and the outer edges of the sliding cover is not shown, to simplify the drawing. The arrangement of the parts of the sliding roof of this invention is handed about the longitudinal axis of the vehicle, so that reference will be made only to the construction of one side of the layout, because the opposite side is the same. The reference numeral 5 indicates the front edge of the sliding cover, the numeral 6 the rear edge. The side edge visible in FIG. 1 of the sliding cover bears the reference 7.

To each of the lateral members of the roof frame 4, a guide rail 8 is attached, the cross-sectional arrangement of which can be seen from FIGS. 7 to 9. The drive cables 11 and 12 (FIG. 7) of the sliding cover 3 are guided to transmit thrust in the channels 9 and 10 of the guide rail 8. Of the two drive cables, which are in force-transmitting engagement by their threaded turns with a drive pinion, not shown, one cable is associated with each side of the sliding cover and is connected by a driver 13 to the rear shoe 14. This part of the drive cable, known as the active cable section, is, in the side of the roof shown in the drawings, guided in the channel 9, while the channel 10 below this guides the free cable end, the so-called inactive cable section, of the opposite side of the sliding roof.

On the guide rail 8, in addition to the rear sliding shoe 14, the forward sliding shoe 15, situated near the front edge 5 of the sliding cover 3, is also slidably guided. This forward sliding shoe 15 is similar in cross-section to the rear sliding shoe 14 shown in FIG. 7. On the forward sliding shoe 15, a forwardly oriented bearing bracket 16 is mounted, which carries at its end the pivot bearing 17. This is constructed as a hinge and is connected by a hinge component 18 to a roof stiffener 19 attached to the sliding cover 3. The oppositely placed pivot bearings 17 are situated on the above-mentioned imaginary horizontal axis extending transversely to the direction of sliding. The direction of sliding is that of guide rail 8.

Adjacent to the lateral edge 7 of the sliding cover 3 and in the vicinity of the rear edge 6, the guide block 20 is mounted parallel to the lateral edge 7 by two fixing angles 21 and 22, which in turn are attached to a further stiffener 19' of the roof cover. The guide block 20 preferably constructed from a wear-resistant plastics, is releasably attached by screws 23 and 24 to the fixing angles 21 and 22, elongated holes 25 and 26 in the fixing angle 21 and guide block 20 ensuring that the guide block can be adjusted vertically, so that the sliding cover 3 can be levelled with its surface flush with the surface of the fixed roof 1. Details of this arrangement can be seen particularly from FIGS. 6 and 8–10.

Reference is now made to FIGS 1 to 5, to explain the engagement of the guide pins mounted on the rear sliding shoe 14 into the guide block. A first guide pin 27 is mounted on the rear sliding shoe 14 and pivotally journals an angle piece 28. To the angle piece 28, there are attached a second guide pin 29 and third guide pin 30, which pass through the slit 31 in the guide block and are connected together at their free ends by a locking member 32. A downwardly open guide block slit 33 is associated with the first guide pin 27. In the closed position of the sliding cover 3, the guide pins 27, 29 and 30 are in the position shown in FIGS. 2 and 3 in the associated guide block slits 31 and 33. In the outward-swinging movement of the sliding cover 3, the rear sliding shoe 14 travels forwards, until in the limiting position the third guide pin 30 arrives at the forward end of the guide block slit 31. Just before the swinging-out movement commences, guide pin 27 moves out of slit 33. The second and third guide pins 29, 30 remain however always in engagement with the guide block slit 31, so that the swung-out roof cover under all conditions of travel is exceptionally firmly supported.

When the sliding cover 3 is swung inwards again, just before its closed position is reached, the first guide pin 27 again enters the associated slit 33. The first guide pin 27, in conjunction with the guide block slit 33, ensures that when the sliding shoe 14 travels backwards starting from the closed position, the rear edge 6 of the roof cover is lowered. The lowering movement is completed as soon as the first guide pin 27 has reached the rear end of its guide block slit 33. Continued backward movement of the rear sliding shoe 14 now leads to an opening displacement of the sliding cover 3, as shown in FIG. 5. The operations in the closure sliding of the cover 3 take place in the reverse sequence.

The constructional features hitherto described of the sliding roof do not form part of the present invention, but have been explained to assist in an understanding of the features of the invention.

The guide finger 34, associated with the side of the sliding roof shown in the drawings, is attached in a manner to be explained to the guide block 20. It projects outwardly from this, so that as viewed in plan according to FIG. 1 it intersects the guide rail 8. In the closed position of the sliding cover 3, the recess 35 passing right through the guide rail 8 is opposite to the guide finger 34, as can be seen especially from FIGS. 5 and 9. The dimensions of the recess 35 are selected so that the guide finger 34 can readily pass through it.

In the closed position of the sliding cover and every swung-out position of same, the detent element 36, which is attached to the end of the leaf-spring 37 situated underneath the guide rail 8, engages into the recess 35. The other end of the leaf-spring 37 is connected to the already mentioned guide piece, which in the example illustrated is the guide shoe 38 of the water gutter 39, situated below the rear edge 6 of the cover and open at both ends. Displacements of the water gutter 39 on the guide rail 8, such as take place during the opening and closure sliding of the cover 3 as a consequence of the arrangement of the connecting strap 40, still to be explained, cause the detent element 36 to be displaced relative to the recess 35.

The connecting strap 40 is hinged at its one end at 41 to the gutter 39, while its other end is hinged to a pivot pin 42 mounted on the guide block 20.

As can be seen from FIGS. 6 and 8–12, both the guide finger 34 and also the pivot pin 42 are mounted on the plate 43, but project from opposite sides of the plate 43. The guide finger 34 passes through an elongated slit 44 in the guide block 20 (FIGS. 6 and 10). Because of the engagement of the guide finger 34 with the elongation slit 44, only one screw 46 is necessary for attaching the plate 43 to the stepped-back region 45 provided for this purpose on the guide block 20, this screw 46 also passing through a longitudinal slit in the plate 43 and engaging in a threaded hole, not referenced, in the guide block 20. By means of the screw 46, the position of the guide finger 34 relative to the recess 35 can be adjusted, the elongated slits 44 and 47 permitting a displacement of the plate 43 relative to the guide block 20.

In the example illustrated, the detent element 36 is constituted of two lugs bent outwards and upwards from the leaf-spring 37, as can be seen in FIG. 10. On the nearer face of the guide finger 34, a rib 48 is provided, which can engage and fit into the detent element 36. The connecting strap 40 may in practice be cranked, as shown in FIG. 6, in order that the connecting strap shall not strike the head of the screw 24 in its swinging movement.

The method of operation of the sliding roof of this invention will now be described. Let it first be assumed that the sliding cover 3 is to be brought from its closed position shown in FIGS. 2 and 3 into the swung-out position shown in FIG. 4. In the closed position, the detent element 36 is in engagement with the recess 35, the guide finger 34 still engaging with its rib 48 into the detent element 36. In the outward-swinging movement, the guide finger 34 now rises out of the detent element 36, but the latter due to the action of the leaf-spring 37 remains in the recess 35, so that the water gutter 39 remains stationary. As a consequence of the hinging of the sliding cover 3 to the gutter 39 by the connecting strap 40, the sliding cover must inevitably move somewhat backwards during its outward swinging movement. During swinging in again of the outwardly swung sliding cover 3 into its closed position, the sliding cover 3 again returns somewhat forwards under the action of the connecting strap 40. It can be seen that the gutter 39 remains stationary also during the pivoting-in operation, so that the sliding cover, positively guided by the connecting strap 40, is supported in a hinged manner from the water gutter 39, so that it is absolutely impossible for the sliding cover 3 to rest upon the rear edge of the fixed roof 1. If, starting from the closed position according to FIGS. 2 and 3, the sliding cover 3 is to be lowered with its rear edge 6, in order to initiate an opening sliding movement, then the guide finger 34 travels downwards and disengages the detent element 36 out of the recess 35. There is now nothing to prevent an opening sliding movement of the cover as shown in FIG. 5. During opening sliding, the guide finger 34 slides with its upper face on the under face of the guide rail 8. During closure displacements therefore, the guide finger 34 ensures, by bearing against the guide rail 8, that the rear edge 6 of the cover cannot rise up, but remains in its lowered position until the sliding cover is situated exactly underneath the roof opening 2 and then, as the roof drive is further operated, can rise because the guide finger 34 is now again opposite to the recess 35, in this case below it. During pivoting of the sliding cover 3 into its closed position, the guide finger 34 passes through the recess 35, the detent element 36 following it because of the leaf-spring 37, until once again the position of the parts shown in FIGS. 1 to 3 has been reached.

I claim:

1. a sliding roof for an automobile having a fixed roof surface with an opening thereon, having a rigid sliding cover, guide rails mounted laterally of the opening in the fixed roof of the automobile extending in the sliding direction of the cover, forward and rear sliding shoes mounted on said guide rails for guiding said cover, guided thrust-transmitting cables engaging said rear sliding shoes for driving said cover, pivot bearings mounted on the forward sliding shoes for journalling said cover to pivot about a horizontal axis extending transversely to the direction of sliding, guide blocks attached to said cover along the lateral edges thereof, and guide pins mounted on said rear sliding shoes engageable with said guide blocks, so that the sliding cover, starting from its closed position, can either be swung upwards like front-hinged ventilator flaps by raising the rear edge thereof above the fixed roof surface of the automobile, or, after the rear edge thereof has been lowered, can be slid underneath the fixed roof surface of the automobile to the rear of the opening therein, whereby a force connection exists between parts attached to the sliding cover and stationary parts which prevents sliding of the cover in the direction of an opening movement while the sliding cover is being swung in from a swung-out position into its closed position, the improvement comprising a guide finger attached to the sliding cover in the vicinity of the rear edge thereof and extending transversely to the sliding direction thereof, a stationary guide element means constituting an integral portion of one of said rails for slideably guiding the cover and extending in the direction of sliding and having a recess therein located adjacent to said guide finger when said sliding cover is in the closed position thereof, a spring-loaded detent element selectively engageable with the recess in said stationary guide element means, a guide piece situated in the region of the rear edge of said sliding cover and slidably guided on the adjacent one of said guide rails and connected to said detent element, said guide piece being connected by a connecting strap to the sliding cover, said connecting strap being hinged at one end to the sliding cover and at the other to said guide piece so as to execute pivotal movements in a vertical plane lying in the direction of sliding, whereby said guide finger, when the rear edge of the cover is lowered, disengages the detent element from the recess, passes through the recess and, during subsequent sliding of the cover, is guided along the underface of the guide element.

2. a sliding roof according to claim 1 wherein said guide fingers are attached with adjustment in the direction of sliding to the ends of said guide blocks nearest to the rear edge of said cover.

3. A sliding roof according to claim 1 wherein the stationary guide element means having the recess therein is a portion of the guide rail for the sliding shoes.

4. A sliding roof according to claim 1 wherein the improved structure set forth is associated with the sliding cover at one side thereof and wherein corresponding improved structure is associated with the sliding cover at the other side thereof.

5. A sliding roof according to claim 4, further including a water gutter situated below the rear edge of the cover and accompanying the movement of the cover, said guide pieces being connected together by said water gutter, and said strips being hinged at one end of said water gutter.

6. A sliding roof according to claim 5, wherein said connecting straps are hinged at their outer end with adjustment in the sliding direction to the ends of the guide blocks nearest to the rear edge of the cover.

7. A sliding roof according to claim 4 further including a plate adjustably attached to said guide block and wherein said guide fingers are each situated on said plate, said plate also pivotally supporting the associated said connecting strap.

8. A sliding roof according to claim 7, wherein said guide finger has on its surface towards the detent element a rib which, in the closed position and every sliding position, fits into and engages with the detent element.

* * * * *